UNITED STATES PATENT OFFICE 2,389,136

MIXED ESTERS CONTAINING THE DIHYDRONORDICYCLOPENTADIENE RING SYSTEM

Herman A. Bruson, Philadelphia, Pa., assignor to The Resinous Products & Chemical Company, Philadelphia, Pa., a corporation of Delaware No Drawing. Application June 4, 1943,
Serial No. 489,698

12 Claims. (Cl. 260—475)

This invention relates to condensation products of dicyclopentadiene with half esters of dicarboxylic acids and to a method for their preparation. The present application is a continuation-in-part of copending application Serial No. 476,639, filed February 20, 1943.

According to this invention, half esters of dicarboxylic acids condense with dicyclopentadiene in the presence of small amounts of acidic condensing agents as catalysts to form mixed esters containing a dihydronordicyclopentadiene radical. The reaction which occurs involves an addition of the carboxyl group of the half ester to one double bond of the dicyclopentadiene and a rearrangement of the dicyclopentadiene nucleus to a hitherto unknown ring system termed the "nordicyclopentadiene" ring system, in accordance with the following equation:

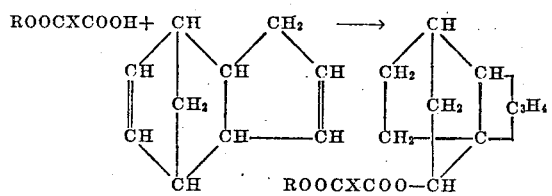

wherein R is the residue of a monohydric alcohol other than a hydroxydihydronorpolycyclopentadiene, X is the non-carboxyl residue of a dibasic carboxylic acid, and $C_3H_4$ is a divalent unsaturated hydrocarbon chain making up a cyclopenteno group in conjunction with the adjoining carbon atoms.

As is evident from the formula for the product just shown, the nordicyclopentadiene ring system consists of an endoethylene cyclopentano group, which carries the functional group as indicated, and a cyclopenteno group attached to the cyclopentano group through two carbon atoms common to both of these cyclic groups. This new ring system results from dicyclopentadiene by addition and rearrangement in the presence of an acidic condensing agent, as has been stated. The ring system derived in this way has been named "nordicyclopentadiene" for the addition-rearrangement product from dicyclopentadiene and "norpolycyclopentadiene" as a generic term for the same sort of products from non-resinous polycyclopentadienes having two double bonds per molecule. The corresponding alcohols of this ring system may be designated as "hydroxydihydronordicyclopentadiene" and "hydroxydihydronorpolycyclopentadiene," respectively.

In the above equation R represents the organic radical of any monohydric alcohol other than a hydroxydihydronorpolycyclopentadiene, for example, methyl, ethyl, isopropyl, n-butyl, iso-butyl, allyl, methallyl, amyl, octyl, dodecyl, cetyl, benzyl, methyl benzyl, butyl benzyl, cyclohexyl, methyl cyclohexyl, chloroethyl, ethoxyethyl, butoxyethyl, tetrahydrofurfuryl, and the like, and X represents a divalent hydrocarbon radical of at least two carbon atoms. The esters formed are unsaturated.

Among the half esters which are most useful as the starting materials for the purpose of this invention are the half esters of succinic, maleic, and phthalic acids with any monohydric alcohol. Other half acid esters can be used from dicarboxylic acids which include glutaric, α-methyl glutaric, α-ethyl glutaric, adipic, β-methyl adipic, pimelic, suberic, azelaic, sebacic, brassilic, para-phenylene diacetic, 2,2-dicarboxymethoxyphenyl-propane, terephthalic, hexahydroterephthalic, isophthalic, diglycolic, thiodibutyric, dipenic, fumaric, dihydromuconic, or the like dicarboxylic acid.

Typical acidic condensing agents are, for example, sulfuric acid, sulfuric acid esters, such as ethyl acid sulfate, sulfonic acids such as toluene sulfonic acid or butyl sulfonic acid, strongly acidic metal salts, and boron trifluoride or its coordination complexes with ethers, alcohols, aldehydes, ketones, carboxylic esters, carboxylic acids, or water. Such boron trifluoride catalysts are of particular importance. They include such complexes as $BF_3.C_2H_5OC_2H_5$, $BF_3.C_4H_9OC_4H_9$, $$BF_3.2C_4H_9OH, BF_3.CH_3OCH_3$$
$$BF_3.2CH_3COOC_2H_5, BF_3.2CH_3COOH$$

$BF_3.CH_3COCH_3$ or $BF_3.(H_2O)_x$ where $x$ is one or two. Of these, the boron trifluoride etherates are particularly effective and are desirably used with the weakest half-esterified carboxylic acids. The acidic condensing agents are used preferably in catalytic amounts of the order of 0.5% to 5% on the weight of the reactants, although larger or smaller amounts can be used.

The reactions go particularly well at 50°–100° C., although both higher and lower temperatures are feasible. The reactions may be conducted, if desired, under pressure. There may be used pure or crude dicyclopentadiene, including cracked petroleum or coal tar distillates containing upwards of five per cent. by weight of dicyclopentadiene. It is surprising that from such crude mixtures of olefines including styrene, indene, and other aromatic hydrocarbons, the dicyclopentadiene can be almost quantitatively picked out by the half ester used without interference by the other unsaturates present.

The products formed, in particular the esters of phthalic acid having the formula:

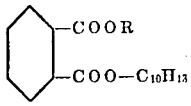

wherein R is a hydrocarbon group of from one to eight carbon atoms and $C_{10}H_{13}$ represents the dihydronordicyclopentadiene radical, are valuable as plasticizers.

The following examples illustrate this invention, the parts being by weight:

*Example 1*

A mixture of 180 parts of phthalic acid monomethyl ester and 132 parts of distilled dicyclopentadiene was stirred and heated to 70° C. To this mixture there was gradually added five parts of boron trifluoride-diethyl ether, $BF_3.O(C_2H_5)_2$, and the mixture stirred at 90°–95° C. for five hours. The product was cooled, washed with water and soda solution, dried, and distilled in vacuo. The mixed ester having the formula:

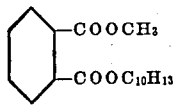

($C_{10}H_{13}$ equals the dihydronordicyclopentadienyl radical, distilled at 205°–215° C./2–3 mm. as a viscous, almost colorless oil in a yield of 250 parts.

*Example 2*

By using 194 parts of phthalic acid monoethyl ester in the procedure described in Example 1, in place of the methyl ester, the corresponding mixed dihydronordicyclopentadienyl ethyl phthalate is obtained as a colorless oil boiling at 190°–200° C./1 mm.

*Example 3*

To a stirred mixture of 222 parts of phthalic acid mono-n-butyl ester and 132 parts of dicyclopentadiene at 50° C., there was gradually added 10 grams of boron trifluoride-dibutyl ether complex, $BF_3.O(C_4H_9)_2$, and the mixture stirred at 95° C. for four hours. The product was washed with water and soda solution, dried, and distilled in vacuo.

The dihydronordicyclopentadienyl n-butyl phthalate distilled over at 230°–235° C./3 mm. as a pale yellow oil.

*Example 4*

A mixture of 64 parts of methanol and 148 parts of phthalic anhydride was boiled under reflux for two hours and the excess methanol distilled off, the last traces being removed in vacuo. The crude half ester crystallized on cooling. It was mixed with 440 parts of a crude olefinic mixture known as "Dripolene" obtained in the cracking of a Texas Panhandle crude petroleum oil and containing about 25%–35% by weight of dicyclopentadiene together with styrene, indene, xylenes, toluene, and other hydrocarbons. The mixture was heated to 75° C. and 5 parts of $BF_3.O(C_2H_5)_2$ was added gradually. The exothermal reaction carried the temperature to about 100° C. When the exothermal reaction had ceased, the mixture was stirred and heated for five hours at 90°–95° C. It was then cooled, washed twice with warm water, then with dilute soda solution, and finally again with warm water. The dried, dark viscous oil was then distilled in vacuo.

The dihydronordicyclopentadienyl methyl phthalate distilled over at 200°–220° C./3 mm. as a thick, pale amber-colored oil in a yield amounting to 224 parts. The still residue (227 parts) was a dark, brittle resin, useful for the preparation of baking varnishes and lacquers. It possessed the following constants: iodine number, 185; saponification value, 116.

*Example 5*

A mixture of 1 gram mol equivalent of phthalic acid monoallyl ester and 1.2 gram mol equivalents of dicyclopentadiene was gradually mixed at 60° C. with five grams of $BF_3.O(C_2H_5)_2$. After the exothermal reaction had ceased, the mixture was stirred at 95° C. for seven hours. It was cooled, then washed several times with water and dilute soda solution, dried, and distilled in vacuo. The dihydronordicyclopentadienyl allyl phthalate distilled over at 217°–220° C./3 mm. as a pale yellow oil.

*Example 6*

A mixture of 98 parts of maleic anhydride and 148 parts of n-butyl alcohol was heated at 95° C. for six hours. The excess butyl alcohol was then evaporated off under reduced pressure. The residual maleic acid half butyl ester was mixed with 132 parts of dicyclopentadiene and heated to 55° C. To the stirred mixture, five parts of $BF_3.O(C_2H_5)_2$ was gradually added at 55°–60° C. The mixture was stirred for thirty minutes at 55°–60° C., then at 95° C. for seven hours. It was cooled, washed with water and dilute soda solution, and thereafter dried and distilled in vacuo.

The dihydronordicyclopentadienyl butyl maleate distilled over at 190° C./2 mm. as a colorless oil. When heated with benzoyl peroxide at 100° C., this oil polymerizes to a viscous syrup.

In the same manner, succinic acid monobutyl ester yields the corresponding dihydronordicyclopentadienyl butyl succinate as a colorless oil.

The products are useful as softening and plastifying agents for nitrocellulose, ethyl cellulose, polyvinyl chloride, and copolymer butadiene rubber.

I claim:

1. A method for preparing mixed esters of organic dicarboxylic acids which comprises condensing a half ester of an organic dicarboxylic acid with dicyclopentadiene in the presence of an acidic condensing agent.

2. A method for preparing mixed esters of organic dicarboxylic acids which comprises condensing an aliphatic half ester of an organic dicarboxylic acid with dicyclopentadiene in the presence of an acidic condensing agent.

3. A method for preparing mixed esters of organic dicarboxylic acids which comprises condensing an aliphatic half ester of an organic dicarboxylic acid with dicyclopentadiene in the presence of a boron trifluoride catalyst.

4. A method for preparing mixed esters of phthalic acid which comprises condensing an aliphatic half ester of phthalic acid with dicyclopentadiene in the presence of an acidic catalyst.

5. A method for preparing mixed esters of phthalic acid which comprises condensing an aliphatic half ester of phthalic acid with dicyclopentadiene in the presence of a boron trifluoride catalyst.

6. As a new compound, a mixed ester of a dicarboxylic acid wherein one of the ester groups is a dihydronordicyclopentadienyl group and the other ester group is from a monohydric alcohol other than a hydroxydihydronorpolycyclopentadiene, said dihydronordicyclopentadienyl group being formed from dicyclopentadiene by an addition-rearrangement reaction occurring in the presence of an acidic condensing agent.

7. As a new compound, a mixed ester of phthalic acid wherein one of the ester groups is a dihydronordicyclopentadienyl group and the other ester group is from a monohydric alcohol other than a hydroxydihydronorpolycyclopentadiene, said dihydronordicyclopentadienyl group being formed from dicyclopentadiene by an addition-rearrangement reaction occurring in the presence of an acidic condensing agent.

8. As a new compound, an ester of the formula:

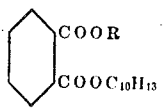

wherein R is a hydrocarbon group of one to eight carbon atoms and $C_{10}H_{13}$ is the dihydronordicyclopentadienyl radical, said radical being formed from dicyclopentadiene by an addition-rearrangement reaction occurring in the presence of an acidic condensing agent.

9. As a new compound, a dihydronordicyclopentadienyl alkyl phthalate, said dihydronordicyclopentadienyl group being formed from dicyclopentadiene by an addition-rearrangement reaction occurring in the presence of an acidic condensing agent.

10. As a new compound, dihydronordicyclopentadienyl methyl phthalate, said dihydronordicyclopentadienyl group being formed from dicyclopentadiene by an addition-rearrangement reaction occurring in the presence of an acidic condensing agent.

11. As a new compound, dihydronordicyclopentadienyl ethyl phthalate, said dihydronordicyclopentadienyl group being formed from dicyclopentadiene by an addition-rearrangement reaction occurring in the presence of an acidic condensing agent.

12. As a new compound, dihydronordicyclopentadienyl butyl phthalate, said dihydronordicyclopentadienyl group being formed from dicyclopentadiene by an addition-rearrangement reaction occurring in the presence of an acidic condensing agent.

HERMAN A. BRUSON.